United States Patent [19]
Sukhman et al.

[11] Patent Number: 5,881,087
[45] Date of Patent: Mar. 9, 1999

[54] GAS LASER TUBE DESIGN

[75] Inventors: Yefim P. Sukhman, Scottsdale; Christian Julian Risser; Mikhail E. Ryskin, both of Phoenix, all of Ariz.

[73] Assignee: Universal Laser Systems, Inc., Scottsdale, Ariz.

[21] Appl. No.: 846,551

[22] Filed: Apr. 30, 1997

[51] Int. Cl.⁶ .................................................. H01J 3/03
[52] U.S. Cl. ................................................. 372/61; 372/87
[58] Field of Search .................................. 372/61, 64, 65, 372/107, 87

[56] References Cited

U.S. PATENT DOCUMENTS

| | | |
|---|---|---|
| 3,593,189 | 7/1971 | Buhrer . |
| 3,763,442 | 10/1973 | McMahan . |
| 4,169,251 | 9/1979 | Laakmann . |
| 4,342,113 | 7/1982 | Iwata . |
| 4,363,126 | 12/1982 | Chenausky . |
| 4,373,202 | 2/1983 | Laakmann . |
| 4,383,203 | 5/1983 | Stanley . |
| 4,429,398 | 1/1984 | Chenausky . |
| 4,443,877 | 4/1984 | Chenausky . |
| 4,451,766 | 5/1984 | Angle . |
| 4,455,658 | 6/1984 | Sutter . |
| 4,493,087 | 1/1985 | Laakmann . |
| 4,563,763 | 1/1986 | Kuhn . |
| 4,589,114 | 5/1986 | Sutter, Jr. . |
| 4,596,018 | 6/1986 | Gruber . |
| 4,612,648 | 9/1986 | Peterson et al. . |
| 4,613,972 | 9/1986 | Bettman . |
| 4,631,449 | 12/1986 | Peters . |
| 4,672,620 | 6/1987 | Slusher . |
| 4,675,874 | 6/1987 | POhler . |
| 4,679,202 | 7/1987 | Maloney . |
| 4,688,228 | 8/1987 | Newman . |
| 4,703,491 | 10/1987 | Lim . |
| 4,719,639 | 1/1988 | Tulip . |
| 4,748,634 | 5/1988 | Hesterman . |
| 4,779,284 | 10/1988 | Nissen . |
| 4,787,090 | 11/1988 | Newman . |
| 4,805,182 | 2/1989 | Laakman ................................... 372/82 |
| 4,809,284 | 2/1989 | Chenausky . |
| 4,833,681 | 5/1989 | Akiyama . |
| 4,837,772 | 6/1989 | Laakmann . |
| 4,847,852 | 7/1989 | Yatsiv . |
| 4,852,109 | 7/1989 | Kuchar . |
| 4,856,010 | 8/1989 | Wissman . |
| 4,875,218 | 10/1989 | Hongo . |
| 4,891,819 | 1/1990 | Sutter, Jr. . |
| 4,893,353 | 1/1990 | Iwaoka . |
| 4,908,585 | 3/1990 | Chenausky . |
| 4,912,526 | 3/1990 | Iwaoka . |
| 4,928,756 | 5/1990 | Shull . |
| 4,930,136 | 5/1990 | Chaffee . |
| 4,953,172 | 8/1990 | Gurski . |

(List continued on next page.)

OTHER PUBLICATIONS

Laakmann, Peter, "The Market Continues to Grow for Sealed Carbon Dioxide Lasers". *Industrial Laser Review*, Oct., 1993. pp. 9–12.

Morley, R.J., "Mode and Frequency Control of Compact $CO_2$ Slab Lasers Through Intra-Cavity Coherent Imaging". *Applied Optics*, vol. 34, No. 3, Jan. 20, 1995. pps.

*Primary Examiner*—Rodney Bovernick
*Assistant Examiner*—Robert E. Wise
*Attorney, Agent, or Firm*—Donald J. Lisa

[57] ABSTRACT

An extruded aluminum gas laser tube assembly (10) has a pair of extruded, elongated, electrically insulated, aluminum electrodes (23,24) adapted to couple to an external RF supply and supported in the laser tube in predetermined spaced-apart relationship relative to each other and to the laser tube (11). The electrode supporting structure is eight pairs of matching, longitudinal, machined grooves (12,21), four pairs at each end of the tube (11) and electrodes (23,24) in each of which pairs is received a cylindrical, insulated, anodized aluminum spacer pin (22) which slidably supports the electrodes in the tube and allows longitudinal expansion of the electrodes relative to the tube substantially without bending.

13 Claims, 2 Drawing Sheets

U.S. PATENT DOCUMENTS

| | | |
|---|---|---|
| 4,953,176 | 8/1990 | Ekstrand . |
| 4,969,153 | 11/1990 | Leyshon . |
| 5,008,894 | 4/1991 | Laakmann . |
| 5,048,032 | 9/1991 | Ekstrand . |
| 5,050,184 | 9/1991 | Nelson . |
| 5,065,405 | 11/1991 | Laakmann . |
| 5,113,407 | 5/1992 | Kobayashi . |
| 5,123,028 | 6/1992 | Hobart . |
| 5,131,003 | 7/1992 | Mefferd . |
| 5,135,604 | 8/1992 | Kumar . |
| 5,150,372 | 9/1992 | Nourrcier . |
| 5,151,916 | 9/1992 | Iehisa et al. . |
| 5,172,388 | 12/1992 | Long . |
| 5,216,689 | 6/1993 | Gardner . |
| 5,224,117 | 6/1993 | Kruger . |
| 5,251,223 | 10/1993 | Hiroshima . |
| 5,253,261 | 10/1993 | Chaffee . |
| 5,260,964 | 11/1993 | Morin . |
| 5,311,529 | 5/1994 | Hug . |
| 5,315,605 | 5/1994 | Nakazawa . |
| 5,335,242 | 8/1994 | Hobart . |
| 5,353,293 | 10/1994 | Shull . |
| 5,353,297 | 10/1994 | Koop . |
| 5,394,427 | 2/1995 | McMinn . |
| 5,412,681 | 5/1995 | Eisel . |
| 5,475,702 | 12/1995 | August . |
| 5,475,703 | 12/1995 | Scalise . |
| 5,479,428 | 12/1995 | Kuzumoto . |
| 5,549,795 | 8/1996 | Gregoire . |
| 5,586,134 | 12/1996 | Das . |
| 5,592,504 | 1/1997 | Cameron . |

GAS LASER TUBE DESIGN

BACKGROUND OF THE INVENTION

1. Fields of the Invention

The present invention relates generally to an apparatus and method for allowing uniform expansion of the electrodes within a gas laser tube, and, more particularly, to an apparatus and method in which a pair of elongated, parallel, electrically insulated electrodes are supported within an elongated gas laser tube to allow sliding, unconstrained, longitudinal movement of the electrodes relative to the tube without torsion to accommodate uneven thermal expansion of the combination while maintaining a predetermined spaced-apart relationship of the electrodes and tube.

2. Discussion of Background and Prior Art

A persistent problem with those gas lasers which typically have a pair of elongated, parallel, electrodes supported in spaced-apart relation within a long sealed tube, such as, air cooled waveguide, air cooled free-space and more recently, air cooled free-space slab lasers, is the uneven longitudinal thermal expansion of the electrodes and tube causing damage to or misalignment of components essential to operation of the laser.

There have been numerous attempts to solve these and related thermal expansion problems in gas lasers with limited success.

a. Mismatched Thermal Expansion

For example, in many cases uneven longitudinal expansion is caused by mismatched coefficients of expansion for the materials used. In a system to Nelson in U.S. Pat. No. 5,050,184 a thin wall was used to flexibly mount a cathode jacket to the discharge tube to allow unrestrained, longitudinal, temperature-related, dimensional changes without interfering with electrical leads. In a similar system to Hiroshima in U.S. Pat. No. 5,251,223 a rod of higher thermal expansion coefficient was used on a similar cathode jacket to prevent asymmetric axial thermal expansion from misaligning the mirrors forming the laser resonator. In a system to Hug in U.S. Pat. No. 5,311,529 the problem was addressed by passing liquid through the annular space between the inner and outer tubes of the laser to achieve minimal asymmetry. The common problem with all of these solutions is that they did not address uneven thermal expansion in air-cooled, elongated, sealed, gas laser tubes housing a pair of elongated parallel electrodes the solution of which it is an object of the present invention to provide.

In still another system to Iwata in U.S. Pat. No. 4,342,113 the laser resonator mirror plates were supported on low thermal expansion rods and then were flexibly attached via a leaf spring to the structural beams subjected to the differential longitudinal heating of the laser discharge area. See also, the similar solution in a system of Bettman in U.S. Pat. No. 4,613,972. While these solutions are installed in the discharge area, they are complex, expensive and especially inappropriate for use in the elongated tubes of air cooled waveguide and free-space gas slab lasers or free-space gas lasers where the discharge area is filled largely with the electrode structures themselves and minimal extra space exists for such complex mechanisms. Accordingly, what is still needed, and it is an object of the present invention to provide, is a simple, inexpensive, longitudinal expansion structure installed in the discharge area of the tubes of especially air cooled waveguide and free-space gas slab lasers or any other lasers employing elongated tubes housing two parallel, insulated, spaced-apart electrodes.

b. Extruded Tubes And Electrodes, And Conduction/Convection Cooled Lasers

A more important and fundamental improvement was made in the system of Laakmann in U.S. Pat. No. 4,805,182 which discloses an all-metal RF-excited gas laser including a pair of spaced, parallel metal plates, an extruded aluminum metal housing including a pair of metal spacers separating the plates, the plates and spacers forming an elongated laser bore, a laser gas medium within the bore; and a pair of extruded aluminum metal discharge electrodes located upon opposing surfaces within the bore and parallel to the longitudinal axis of the bore, the electrodes being excitable by a source of RF-excited voltage, the electrodes being electrically insulated from opposing surfaces by nonconductive films between the electrodes and the opposing surfaces, respectively. By using the high thermal conductivity of the lasing gas to cool the electrodes inside of the laser discharge tube (gas conduction and convection cooling) and by better matching the thermal coefficient of the aluminum electrodes with that of the insulating medium, Laakmann taught that inexpensive extruded aluminum tubes and electrodes and an all-welded construction could be successfully used. (7:14–50; 11:4–12). In several embodiments Laakmann discloses a cooling structure based on heat conduction through the extruded metal electrodes and tube helped by the placement of loose fitting alumina ceramic pieces in recesses in the electrodes. (FIG. 4; 7:56–57; 8:12–30). In these structures, the electrodes are supported in predetermined, spaced-apart relation to each other and to the tube by a protrusion 51 resting in a V-groove 49. (FIG. 4; 7:62–8:11; FIG. 8; 10:19–45).

It is also important to recognize that for many reasons Laakmann's RF-excited, all metal gas laser does not have nearly as severe a heat and expansion problem as is experienced in the present invention. Laakmann has fundamentally 4 structures (2 large electrodes and 2 large spacers) defining a square bore as the discharge area. Importantly therefore, the temperature differential between the electrodes inside the laser tube and the laser tube itself is much smaller in Laakmann's design than in the present invention. Accordingly, applicants' longitudinal expansion of the electrodes relative to the tube is much more severe than in Laakmann.

Importantly, Laakmann does not disclose or suggest using pairs of matching grooves each of which receives a spacer, which accommodates longitudinal expansion by torsion-free, sliding contacts between the electrodes and the housing. Accordingly it is an object of the present invention to slidingly accommodate longitudinal expansion using a spacer slidingly received in a pair of matching grooves in an all-metal, extruded, laser tube and electrodes combination.

However, slidingly accommodating longitudinal expansion in a gas laser is also known. In a system to Slusher in U.S. Pat. No. 4,672,620 there is disclosed an axial flow DC laser in which the mirror stabilization system is built with near-zero thermal expansion characteristics. (FIG. 7; 8:14–9:45). But then, to prevent the longitudinal thermal expansion and contraction of the stronghold 104 from being coupled back into the now stabilized mirror structures, Slusher provides spherical bearings 176,178 to secure the front mirror mount slidingly to the stronghold (FIG. 2A) and spherical bearing 180 to slidingly secure the rear mirror mount to the stronghold (FIG. 2B), respectively, in torsion free movements. (9:46–10:6). Importantly, Slusher does not have a pair of parallel elongated electrodes as in the present invention. Accordingly, Slusher fails to suggest, there remains an unfilled need for, and it is an object of the present invention to provide, a solution to accommodate unconstrained, non-torsional longitudinal expansion between the electrodes and the tube of elongated gas lasers having elongated parallel electrically insulated electrodes in the discharge area.

Further objects and advantages will be apparent from the summary and detailed description of the present invention which follows.

SUMMARY OF THE INVENTION

Set forth below is a brief summary of the invention in order to achieve the forgoing and other benefits and advantages in accordance with the purposes of the present invention as embodied and broadly described herein.

One aspect of the invention is in a gas laser having a gas containment structure, a pair of electrically insulated electrodes mounted in the gas containment structure forming a gas discharge area, a laser gas mixture sealed in the gas containment structure, an RF feed terminal coupled to at least one electrode and adapted to couple to a source of RF excitation, and an arrangement of reflective optical elements aligned with the discharge area for producing optical energy, wherein the improvement includes a plurality of pairs of matching, longitudinal grooves in the gas containment structure and each electrode, and an insulated spacer received in each pair of matching grooves for supporting the electrodes in a predetermined, insulated, spaced-apart relationship relative to each other and to the gas containment structure, whereby the electrodes may uniformly expand relative to the gas containment structure.

A further feature of this aspect of the invention is wherein the gas containment structure and electrodes are extruded from aluminum or other suitable metal.

A further feature of this aspect of the invention is wherein there are eight pairs of grooves, four each at each end of the gas containment structure and electrodes.

A further feature of this aspect of the invention is wherein the pair of matching grooves further includes an elongated recess in the end of the gas containment structure, and an elongated recess in the end of the electrode adjacent the corresponding recess in the end of the gas containment structure when the electrode is assembled within the gas containment structure.

A further feature of this aspect of the invention is wherein the spacer is a cylindrical pin made from anodized aluminum.

A further feature of this aspect of the invention is wherein the electrodes expand slidingly, longitudinally relative to a longitudinal axis of the gas containment structure substantially without torsion and substantially without bending.

Another aspect of the invention is in a gas laser process including the steps of containing a gas in a structure, forming a gas discharge area by supporting a pair of electrically insulated electrodes in the gas containment structure, sealing a laser gas mixture in the gas containment structure, coupling an RF feed terminal to at least one electrode and adapted to couple to a source of RF excitation, and forming a laser resonator aligned with the discharge area for producing directional optical energy, wherein the improvement includes the steps of forming a plurality of pairs of matching, longitudinal grooves in the gas containment structure and each electrode, and receiving an insulated spacer in each pair of matching grooves for supporting the electrodes in a predetermined, insulated, spaced-apart relationship relative to each other and to the gas containment structure, whereby the electrodes may slidingly expand longitudinally relative to a longitudinal axis of the gas containment structure substantially without bending.

The advantages of the present invention are:
1. Unconstrained longitudinal expansion of the electrodes relative to the gas laser tube.
2. Automatic positioning of the electrodes relative to each other and to the tube.
3. Insulation between the electrodes and the tube.
4. Substantial elimination of bending forces applied to the electrodes and the tube.
5. Stabilization of the laser resonator.
6. Lower production costs.

DETAILED DESCRIPTION OF THE PREFERRED EMBODIMENT a. Tube Assembly

Figure 1:
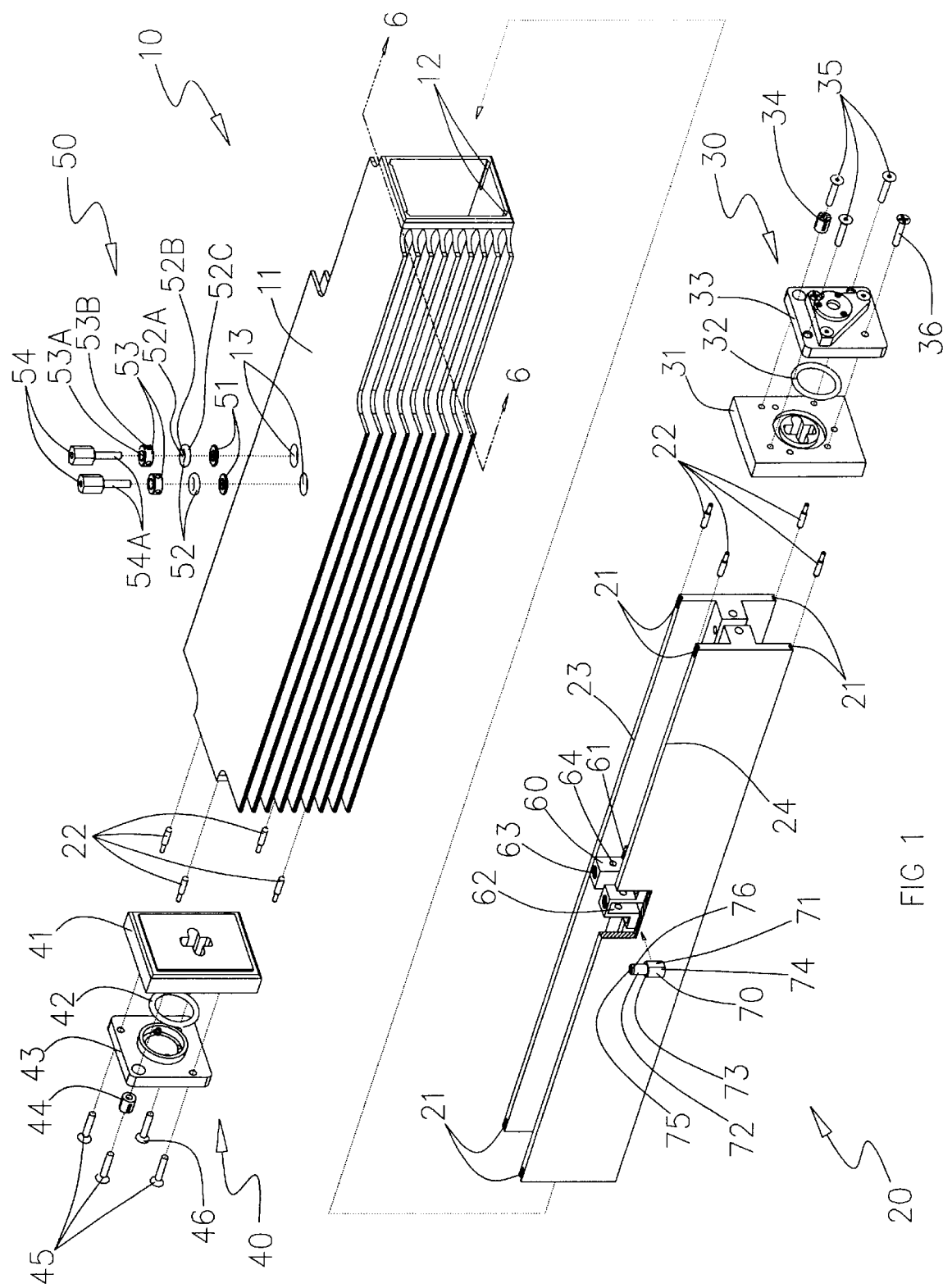
FIG. 1 is an exploded perspective view of the gas laser tube assembly of the present invention showing the pairs of longitudinal grooves in the tube and electrodes and the insulated pins received therein.

As best seen in FIG. 1 the tube assembly 10, which includes electrode assembly 20, front mirror/end cap assembly 30, rear mirror/end cap assembly 40, and integrated feed/fill assembly 50 of the present invention, are shown in an exploded perspective. Tube assembly 10 includes tube 11 which is an extruded, profiled, and finned aluminum, stainless steel or ceramic structure completely sealed except for the end openings and the feed/fill ports 13 which are also sealed as described in greater detail below. As best seen in FIG. 1,2, machined in each end of tube 11 are four longitudinal grooves or recesses 12, one at each corner to cooperate with matching longitudinal grooves or recesses 21 preferably extruded, but alternatively machined, stamped, or EDM'd (electrical discharge machining) in the outer ends of each of the electrodes. Insulated pins 22 are received in machined recesses 12,21 when the electrode assembly 20 is mounted inside tube assembly 10 and accommodate unrestricted longitudinal expansion of the electrodes within the tube 11 substantially without distortion due to differential heating of the tube during normal laser operations. (FIG. 2).

b. Electrode Assembly

Figure 2:
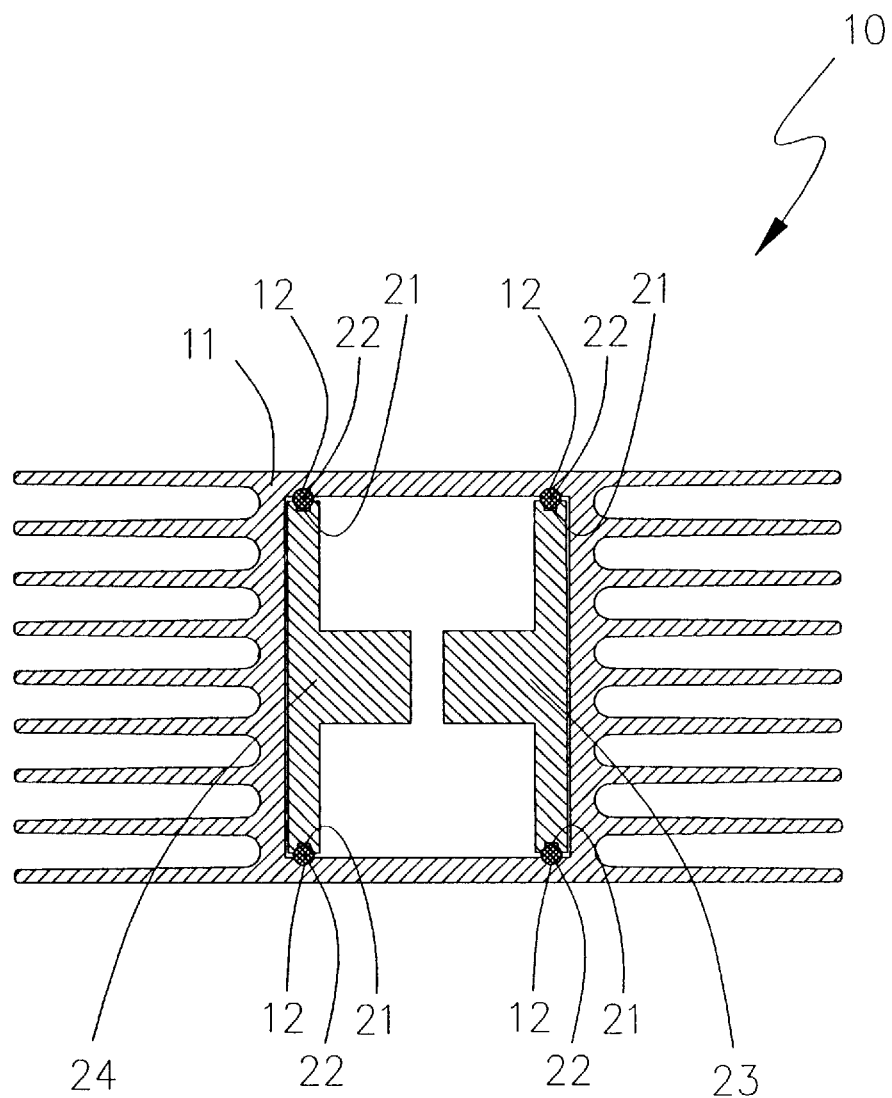
FIG. 2 is a front elevation view in section along the line 6—6 of FIG. 1 showing the pins received in the pairs of longitudinal grooves of the present invention.

As seen in FIGS. 1, 2, electrode assembly 20 includes right electrode 23 and left electrode 24 together with a plunger housing 60 mounted by screws 61 to each electrode and having a slot 62, a top fill gas opening 63 of extra large dimension for self adjustment of the RF feeds during assembly, as described in greater detail below, and a pair of side gas fill openings 64. Slidably mounted within slot 62 for up and down movement is plunger 70 having flatted sides 71 which ride in and are guided by slot 62 and prevent rotation of the plunger 70 in the slot 62. Plunger 70 has a stem portion of reduced diameter 72 extending upwardly from a larger diameter portion 74 forming a shoulder 73 therebetween. The end of stem 72 is tapered 76 to fit into the center bore 52b of O-ring 52 without damaging the O-ring as more fully described below. Stem 72 of plunger 70 has a threaded central recess 75 to cooperate with the threaded stem 54a of RF feed terminal 54, as more fully described below.

c. Integrated Feed/Fill Assembly

The next step in assembling tube assembly 10 is to insert electrode assembly 20 into laser tube 11 and align top gas fill openings 63 of plunger housings 60 with the feed/fill ports 13. Next, RF feed terminals 54 are inserted through bushings 53, O-rings 52, and spacer washers 51 and then threaded 54a into the threaded central recesses 75 of plungers 70.

Bushings 53 have central bores 53a through which are disposed the threaded reduced diameter stems 54a of RF feed terminals 54. Bushings 53 further include lateral openings 53b communicating with central bores 53a and openings 13 of tube 11 which in turn communicate with top gas fill openings 63 of plunger housings 60 and side gas fill openings 64 of plunger housings 60 to form a pair of continuous evacuation and gas fill passageways when RF feed terminals 54 and plungers 70 are in their first opened positions. Those passageways are sealed by O-rings 52 when RF feed terminals 54 and plungers 70 are in their second positions drawn together by screwing RF feed terminal stems 54a into plunger threaded recesses 75 drawing the two components together and simultaneously compressing O-rings 52.

d. Front Mirror/End Cap Assembly

As viewed in FIG. 1, the front mirror/end cap assembly 30 is first sub-assembled before it is sealingly attached to close the front of tube 11. The sealing attachment of front mirror/end cap assembly 30 to the front end of the tube 11 (and also the sealing attachment of rear mirror/end cap assembly 40 to the rear end of tube 11) is preferably done by welding. However, it may also be accomplished by use of epoxy compound or an O-ring compressed by a screwed mounting.

As best seen in FIG. 1, front mirror/end cap assembly 30 includes front end plate 31 having an O-ring recess adapted to receive front mirror assembly O-ring 32 therein and having a beam aperture therein corresponding substantially to the gap between electrodes 23 and 24.

Front mirror assembly 33 is secured to tube front end plate 31 via screws 35 inserted through corresponding mounting holes in front mirror assembly 33. Screws 35 are screwed into threaded holes in front plate 31 pressing against O-ring 32 and forming a gas tight seal therebetween. Triangulated mirror adjustments are made via adjusting screws on front mirror assembly 33 and screw 36, and once the front mirror assembly is adjusted, it is locked in place with mirror lock 34 by one of the screws 35 in a procedure which is well known to those of ordinary skill in the art.

e. Rear Mirror/End Cap Assembly

Rear mirror/end cap assembly 40, as best seen in FIG. 1, includes a tube rear end plate 41 which sealingly closes the rear end of tube 11 and has a central aperture conforming generally to the discharge gap between electrodes 23,24. Rear mirror assembly 43 is mounted to tube rear end plate 41 compressing O-ring 42 to form a gas tight seal therebetween. Rear mirror assembly 43 is secured to rear end plate 41 via rear mirror screws 45 inserted through mounting holes in rear mirror assembly 43 and secured in threaded rear mirror mounting screw holes in rear end plate 41. The same triangulated mirror adjustment mechanism is operable with respect to rear mirror assembly 43 via adjustment screw 46 as was effective for the two mirrors in the front mirror assembly 43.

Together the front and rear mirror/end cap assemblies 30,40 form an optical resonator aligned with the discharge area for producing directional optical energy in and emanating from the discharge area.

f. Integrated RF Feed/Fill Cooperative Action

The cooperative action of the components of the integrated RF feed/fill structure includes plunger 70 moveable between a first position in which reduced stem portion 72 is removed from the central bore 52b of O-ring 52 and central bore 53a of bushing 53, when RF feed terminal 54 is in its first position unscrewed from within threaded central recess 75 of plunger 70, and a second position with the tapered tip 76 of stem 72 smoothly moved upwardly into the central bore 52b of O-ring 52 and the central bore 52a of bushing 53 thereby sealingly contacting O-ring 52 to reseal the housing, when RF feed terminal 54 is in the second position with stem 54a screwed into plunger threaded central recess 75 causing bushing 53 to compress O-ring 52 to reseal the housing. The seal includes the inner circumference 52a of O-ring 52 bearing against the outside diameter of stem 72 of plunger 70 and also outer circumference 52c of O-ring 52 bearing against a vertical wall of feed/fill recess 13 of tube 11.

One advantage of this aspect of the construction is that the size of the top gas fill opening 63 is made large such that there is substantial clearance with the outside diameter of the stem 72 of the plunger. When RF feed terminal 54a is rotated and draws the plunger 70 upwardly, stem 72 has plenty of room to laterally self adjust itself as it enters opening 63 and as its tapered tip 76 enters the central bore 52a of O-ring 82 thereby substantially eliminating any torsional stress or load on the electrode. Thus, no bending forces are applied to the electrodes 23,24.

It is readily apparent that the structure of the integrated RF feed/fill structure allows for a much wider clearance to be provided than was available in the prior art when the RF feed terminal 54 and plunger 70 are in their first positions enabling rapid evacuation of the housing and fast filling the housing with the laser gas.

Additionally, when plunger 70 is in its second (upper) position, electrical coupling is completed between RF feed 54 and electrode 24 when shoulder 73 of plunger 70 contacts and is held firmly against plunger housing 60 which is secured in direct contact with electrode 24 by screws 61.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In a gas laser having
    a gas containment structure,
    a pair of electrically insulated electrodes mounted in the gas containment structure forming a gas discharge area,
    a laser gas mixture sealed in the gas containment structure, an RF feed terminal coupled to at least one electrode and adapted to couple to a source of RF excitation, and an arrangement of reflective optical elements aligned with the discharge area for producing directional optical energy, wherein the improvement comprises:

a plurality of pairs of matching, longitudinal grooves in the gas containment structure and each electrode, and an insulated spacer received in each pair of matching grooves for supporting the electrodes in a predetermined, insulated, spaced-apart relationship relative to each other and to the gas containment structure, whereby the electrodes may uniformly expand relative to the gas containment structure.

2. The gas laser of claim 1 wherein the electrodes are machined.

3. The gas laser of claim 1 wherein the gas containment structure and electrodes are extruded.

4. The gas laser of claim 1 wherein the plural number of pairs is eight, four each at each end of the gas containment structure and electrodes.

5. The gas laser of claim 1 wherein the pair of matching grooves further comprises;

an elongated recess in the end of the gas containment structure, and an elongated recess in the end of the electrode adjacent the corresponding recess in the end of the gas containment structure when the electrode is assembled within the gas containment structure.

6. The gas laser of claim 1 wherein the spacer is a pin.

7. The gas laser of claim 6 wherein the pin is cylindrical.

8. The gas laser of claim 7 wherein the pin is made from anodized aluminum.

9. The gas laser of claim 1 wherein the electrodes expand slidingly.

10. The gas laser of claim 1 wherein the electrodes expand longitudinally relative to a longitudinal axis of the gas containment structure.

11. The gas laser of claim 1 wherein the electrodes expand substantially without torsion.

12. The gas laser of claim 1 wherein the electrodes and gas containment structure expand substantially without any bending.

13. In a gas laser process including the steps of:

containing a gas in a structure, forming a gas discharge area by supporting a pair of electrically insulated electrodes in the gas containment structure, sealing a laser gas mixture in the gas containment structure, coupling an RF feed terminal to at least one electrode and adapted to couple to a source of RF excitation, and forming a laser resonator aligned with the discharge area for producing directional optical energy, wherein the improvement comprises the steps of forming a plurality of pairs of matching, longitudinal grooves in the gas containment structure and each electrode, and receiving an insulated spacer in each pair of matching grooves for supporting the electrodes in a predetermined, insulated, spaced-apart relationship relative to each other and to the gas containment structure, whereby the electrodes may slidingly expand longitudinally relative to a longitudinal axis of the gas containment structure substantially without any bending.

* * * * *